United States Patent

[11] 3,588,204

[72] Inventors Valentin Vasilievich Abashkin
Moskovskaya Oblast, Podolsky raion, poselok Scherbinka, Sadovaya Ulitsa, 4, Kv. 17, Moskovskaya Oblast;
Petr Ivanovich Travin, Ulitsa Markhlevskogo, 20/2, Kv. 47, Moscow, U.S.S.R.
[21] Appl. No. 768,322
[22] Filed Oct. 17, 1968
[45] Patented June 28, 1971

[54] AXLE-BOX FOR AXLE OF PAIR OF WHEELS OF TRACK ROLLING STOCK
1 Claim, 2 Drawing Figs.
[52] U.S. Cl. .................................................. 308/184
[51] Int. Cl. ................................................. F16c 19/04
[50] Field of Search ........................................... 308/180, 184

[56] References Cited
UNITED STATES PATENTS
977,692  12/1910  Zohn .......................... 308/184
2,186,686  1/1940  Stanley ....................... 308/184
2,573,159  10/1951  Noe ........................... 308/184
3,276,395  10/1966  Heintzel ...................... 308/180
FOREIGN PATENTS
128,577  8/1919  Great Britain ................. 308/180

Primary Examiner—Fred C. Mattern, Jr.
Assistant Examiner—Frank Susko
Attorney—Waters, Roditi, Schwartz & Nissen ABSTRACT: An axle-box for the axle of a pair of wheels of track rolling stock comprises a body which is open from below and which receives a pair of coaxial rolling contact bearings. Between the body and contact bearings is a half ring elastic gasket enveloping both contact bearings. The half ring has opposite edges which are inclined outwardly to embrace the body and resist axial load. Concentric spacer rings of elastic material are mounted between inner and outer rings of the bearings and the spacer rings and gasket provide for self-adjustment of the roller contact bearings when the axle journal is deformed under external load.

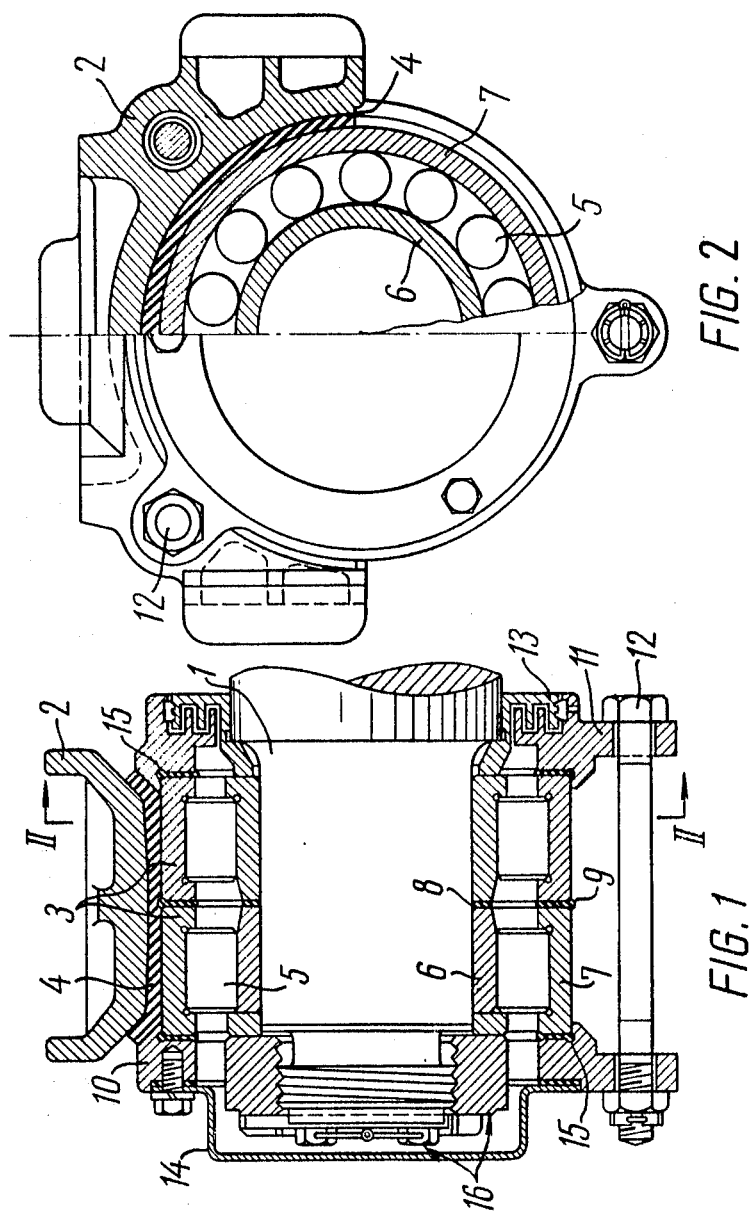

AXLE-BOX FOR AXLE OF PAIR OF WHEELS OF TRACK ROLLING STOCK

The present invention relates to running gear of track rolling stock and, more particularly, to axle-boxes for the axle of a pair of wheels of track rolling stock.

Known is an axle-box for the axle of pair of wheels of track rolling stock, having a body open from below and a rolling contact bearing provided on the axle journal.

Said axle-box does not compensate for warpage of the working surfaces of the bearing in the case of deformation of the axle journal under load, which results in uneven distribution of loads along the rollers, as well as along the outer and inner rings of the bearing.

Furthermore, said axle-box does not ensure uniform distribution of radial loads between the bearing rollers, emerging as a result of warpage in a horizontal plane of the side frames of the carriage during the car travel.

Besides, the known axle-box fails to ensure uniform transfer of load onto the bearing rollers in the case of pendulum oscillations of the side frames in relation to the vertical plane.

All these disadvantages considerably reduce the service life of the bearing and impair the reliability of its operation.

It is an object of the present invention to provide an axle-box ensuring uniform distribution of loads along the rollers, as well as along the outer and inner rings of bearings.

Another object of the present invention is to provide an axle-box ensuring uniform distribution of radial loads between the bearing rollers in the case of warpage of the side frames of the carriage in the horizontal plane.

Still another object of the invention is to provide an axle-box ensuring uniform transfer of loads onto the bearings rollers in the case of pendulum oscillations of the side frames in relation to the vertical plane.

Also an object of the invention is to provide an axle-box free of assembly warpage of the working elements of the bearing, as well as reducing the inertia component of forces acting on the axle-box because of an unsprung weight of a side frame of the carriage.

According to these and other objects, the present invention provides an axle-box for the axle of a pair of wheels of track rolling stock, whose body, open from below, houses at least one rolling contact bearing.

According to the invention, an elastic gasket made as a semiring enveloping the top portion of the bearing is provided between the axle-box body and the rolling contact bearing.

It is feasible to make the semiring enveloping the top portion of the bearing with the edges bent outwardly.

With at least two bearings provided on the axle journal, it is feasible to arrange between them distance rings made from elastic material.

The axle-box of the invention helps prolong the service life of rolling contact bearings by 1.5—2 times and appreciably increases their reliability in operation.

The invention will be more apparent from an exemplary embodiment of the present invention, reference being had to the appended drawings, wherein:

FIG. 1 shows an axle-box for the axle of pair of wheels, according to the invention, in longitudinal section; and FIG. 2 is a front view thereof partially in section as taken on line II–II in FIG. 1.

An axle-box is installed on an axle journal 1 (FIGS. 1 and 2) of a pair of wheels. A body 2 of said axle-box houses rolling contact bearings 3.

An elastic gasket 4 made as a half ring enveloping the top portion of the bearings 3 is provided between the body 2 and the rolling contact bearing 3. The edges of the elastic gasket 4 are bent outwardly in the direction of the body 2 to resist axial forces.

The elastic gasket 4 narrows endwise in cross section; in longitudinal section, the thickness is largest on the side of the butt of the axle journal and smallest on the side of the wheel.

This peculiarity of the gasket shape ensures uniform distribution of the load along rollers 5 and between them, as well as along the inner and outer rings of the bearings 3.

Such an embodiment of the elastic gasket 4 ensures the damping of axial forces acting on the axle-box, as well as a uniform distribution of load on the rolling contact bearings 3 in the case of warpage of the side frames (not shown in the drawings) of the carriage in horizontal and vertical planes.

Provided between the inner ring 6 and the outer ring 7 of the rolling contact bearings 3 are spacer rings 8 and 9 made from elastic material.

The provision of the elastic spacer rings 8 and 9 combined with the elastic gasket 4 creates conditions for self-adjustment of the rolling contact bearings 3 when the axle journal 1 is bent under the action of external loads. In addition, the spacer ring 9 ensures the tightness of the axle-box.

The axle-box is closed from both sides with front and rear covers 10 and 11. These covers are interconnected by means of bolts 12.

From the wheel side, the axle-box has a labyrinth seal 13, and from the outside it has an inspection cover 14 protecting the axle-box from dust and moisture.

Elastic gaskets 15 are provided between the front cover 10 and the outer rings 7 of the forward bearing 3, as well as between the rear cover 11 and the outer ring 7, for the sake of air-tightness.

The rolling contact bearings 3 are secured on the journal of the axle 1 by means of device 16.

The axle-box of pair of wheels of track rolling stock operates as follows.

With the pair of wheels being in motion, loads act on the axle-boxes in vertical and horizontal-lateral directions. Furthermore, the twisting motion of the pair of wheels causes moments of inertia forces acting on the axle-boxes in the case of warpage of the side frames of the carriage.

The value and reiteration of these loads depends upon the design and operation parameters of a movable unit (static load, static spring deflection, wear, etc.), as well as motion speed and peculiarities of cooperation between the track and the running gear of said movable unit.

Under the action of the aforementioned loads, the journal of the axle 1 is bent, and the rolling contact bearings are set relative to one another at different angles.

Automatic self-adjustment of the rolling contact bearings under the action of external forces, variable in value and direction, is possible owing to varied deformation of the elastic gasket 4 under the forward and rear rolling contact bearings, as well as varied deformation of the elastic spacer rings 8 and 9 in the areas where the inner and outer rings of the rolling contact bearings draw together or move away.

This peculiarity of the operation ensures uniform distribution of loads along the rollers 5, as well as along the inner 6 and outer rings 6 and 7 of the rolling contact bearings.

The cooperation of the elastic gasket 4 with the curvilinear surface of the outer rings of the rolling contact bearings ensures the operation of the elements of this gasket under the action not only radial loads but the forces of their shift on the curvilinear surface as well, ensuring a uniform distribution of radial loads between the rollers of the rolling contact bearings 3.

In addition, the provision of such axle-boxes improves considerably the running features of carriages of the rolling stock owing to reduced inertia forces absorbed by the elastic gaskets provided between the bearings and the bodies of the axle-boxes.

Although the present invention has been described with reference to an exemplary embodiment thereof, various alterations and modifications can be made without departing from the spirit and scope of the invention, as those skilled in the art will readily understand.

These alterations and modifications are to be considered as falling within the essence and scope of the invention, as specified in the appended claims.

We claim:

1. An axle-box for the axle of a pair of wheels of track rolling stock, said axle-box comprising: a body open from below; a pair of coaxial rolling contact bearings in said body;

an elastic gasket between said body and said rolling contact bearings and constituted as a half ring enveloping both the rolling contact bearings, said half ring having outwardly inclined edges embracing said body to resist axial load, said bearings including respective inner and outer rings; and concentric spacer rings of elastic material between the inner and outer rings of the bearings.